United States Patent
Cheong

(10) Patent No.: US 6,795,014 B2
(45) Date of Patent: Sep. 21, 2004

(54) METHOD AND APPARATUS FOR DETECTING VEHICLE DISTANCE

(75) Inventor: Hyuck-Jin Cheong, Bucheon (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/441,846

(22) Filed: May 19, 2003

(65) Prior Publication Data

US 2004/0080450 A1 Apr. 29, 2004

(30) Foreign Application Priority Data

Oct. 28, 2002 (KR) .............................. 10-2002-0065908

(51) Int. Cl.[7] .............................................. G01S 13/08
(52) U.S. Cl. ........................ 342/118; 342/55; 342/70; 342/74; 342/123
(58) Field of Search ......................... 342/66, 70–74, 342/82, 118, 123, 140, 154, 158, 157, 179, 181, 182, 185, 191, 354, 386, 450, 451, 453, 457, 458

(56) References Cited

U.S. PATENT DOCUMENTS

| | | | | |
|---|---|---|---|---|
| 5,026,153 A | | 6/1991 | Suzuki et al. | |
| 5,410,346 A | * | 4/1995 | Saneyoshi et al. | 348/116 |
| 5,892,855 A | * | 4/1999 | Kakinami et al. | 382/291 |
| 6,282,478 B1 | * | 8/2001 | Akita | 701/70 |
| 6,285,778 B1 | * | 9/2001 | Nakajima et al. | 382/104 |
| RE37,610 E | * | 3/2002 | Tsuchiya et al. | 340/435 |
| 6,631,312 B2 | * | 10/2003 | Ryoo | 701/1 |
| 2002/0080617 A1 | * | 6/2002 | Niwa et al. | 362/465 |
| 2003/0093220 A1 | * | 5/2003 | Andersson et al. | 701/207 |

FOREIGN PATENT DOCUMENTS

JP  08-319563  11/1996

* cited by examiner

*Primary Examiner*—Thomas H. Tarcza
*Assistant Examiner*—Isam Alsomiri
(74) *Attorney, Agent, or Firm*—Morgan Lewis & Bockius LLP

(57) ABSTRACT

Stableness in detecting the distance to a preceding vehicle by calculating the distance to the preceding vehicle using reflected waves of a radar beam scanned at a scanning angle that is adjusted based on lane markers extracted from a road image obtained by a camera.

10 Claims, 3 Drawing Sheets

METHOD AND APPARATUS FOR DETECTING VEHICLE DISTANCE

FIELD OF THE INVENTION

Generally, the present invention relates to a method and apparatus for detecting the distance between vehicles. More particularly the present invention relates to a method and apparatus for detecting vehicle distance based on reflected waves of a beam scanned by radar.

BACKGROUND OF THE INVENTION

Recently, vehicle design trends have been moving from passive vehicle control, in which the behavior of a vehicle is controlled by a driver, to active control, in which a vehicle actively controls its own behavior. For example, an adaptive cruise control (ACC) system that controls a vehicle's speed to automatically maintain a certain distance to a preceding vehicle has almost been commercialized.

In order to safely provide an ACC system there must be an accurate technique for detecting distance to a preceding vehicle. Traditionally, radar, using laser or millimeter waves has been widely adopted to detect the distance to a preceding vehicle. Using such a system to detect the distance, a radio wave (laser or millimeter wave) is projected to and reflected from a preceding vehicle. The reflected beam or wave is then detected and analyzed to calculate the distance to the preceding vehicle.

When the vehicles are running on a flat road, the distance to the preceding vehicle can be accurately measured. However, if the road undulates, the preceding vehicle may become positioned vertically higher or lower than the projected scanning radar beam from the vehicle equipped with an ACC. In such a case, the following vehicle may fail to detect the distance to the preceding vehicle. Therefore, a drawback of the existing device is that when the vertical undulation of the road is large a preceding vehicle falls outside the vertical width of the scanning beam. Therefore, no vehicle is detected and the vehicle distance detecting device would improperly judge the driving condition.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An exemplary apparatus for detecting distance to a preceding vehicle includes a radar for scanning a radar beam from the vehicle, a scanning angle adjusting for adjusting a scanning angle of the radar, a camera for acquiring a road image, and an electronic control unit. The electronic control unit is activated by predetermined software that comprises instructions for each step of a method for detecting distance to a preceding vehicle.

Another exemplary method for detecting distance to a preceding vehicle useful with the present invention includes receiving a signal of a road image from a camera and extracting lane markers from the road image. The method further includes adjusting a scanning angle of the radar based on the extracted lane markers and calculating a distance to the preceding vehicle using reflected waves of a radar beam scanned at the adjusted scanning angle.

In a further preferable embodiment, the scanning angle is adjusted by calculating a height within the image at which a horizontal distance between the extracted lane markers is a predetermined distance. Calculating the slope of the road from the calculated height and adjusting the scanning angle of the radar based on the calculated slope of the road.

In a still further preferable embodiment, the slope of a road is calculated based on a difference between the calculated height within the image at which a horizontal distance between the lane markers is a predetermined distance and a reference height at which a horizontal distance between lane markers is a predetermined distance.

In a still further preferable embodiment, the reference height within the image corresponding to lane markers separated by a predetermined horizontal distance is an average value of the calculated height within the image corresponding to lane markers separated by a predetermined horizontal distance over a predetermined period.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
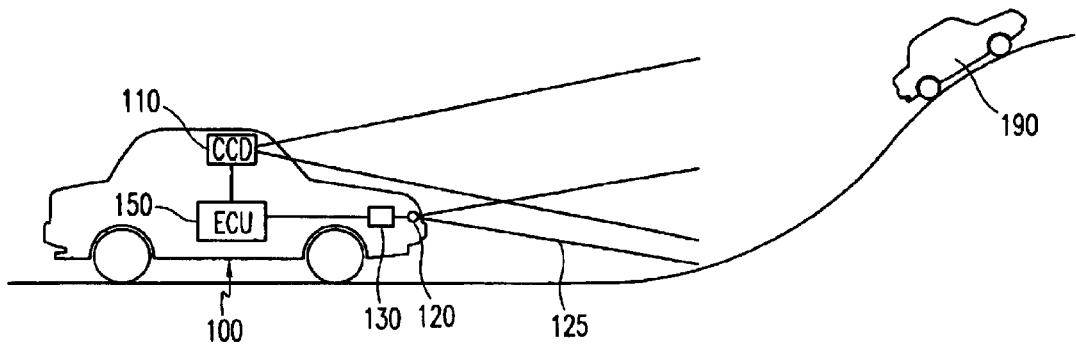
FIG. 1 is a schematic diagram of an apparatus for detecting distance to a preceding vehicle according to an embodiment of the present invention.

FIG. 1 is a schematic diagram of an apparatus for detecting distance to a preceding vehicle according to a preferred embodiment of the present invention. The apparatus includes a radar 120 for scanning a radar beam 125 from a vehicle 100. A scanning angle adjusting 130 for adjusting the scanning angle of the radar 120, a camera 110 for acquiring a road image in front of the vehicle 100, and an electronic control unit (ECU) 150 activated by predetermined software. The radar 120 may scan radio waves of any frequency. The camera 110 is preferably a closed-circuit digital (CCD) camera.

The scanning angle adjustor 130 adjusts the scanning angle of the radar 120 under the control of the ECU 150. The scanning angle adjustor 130 can be realized by a person skilled in the art, for example, by using a motor and gears. The ECU 150 can be realized by one or more processors activated by predetermined software, and the predetermined software can be programmed to perform each step of a method for detecting a vehicle distance according to a preferred embodiment of the invention.

Figure 2:
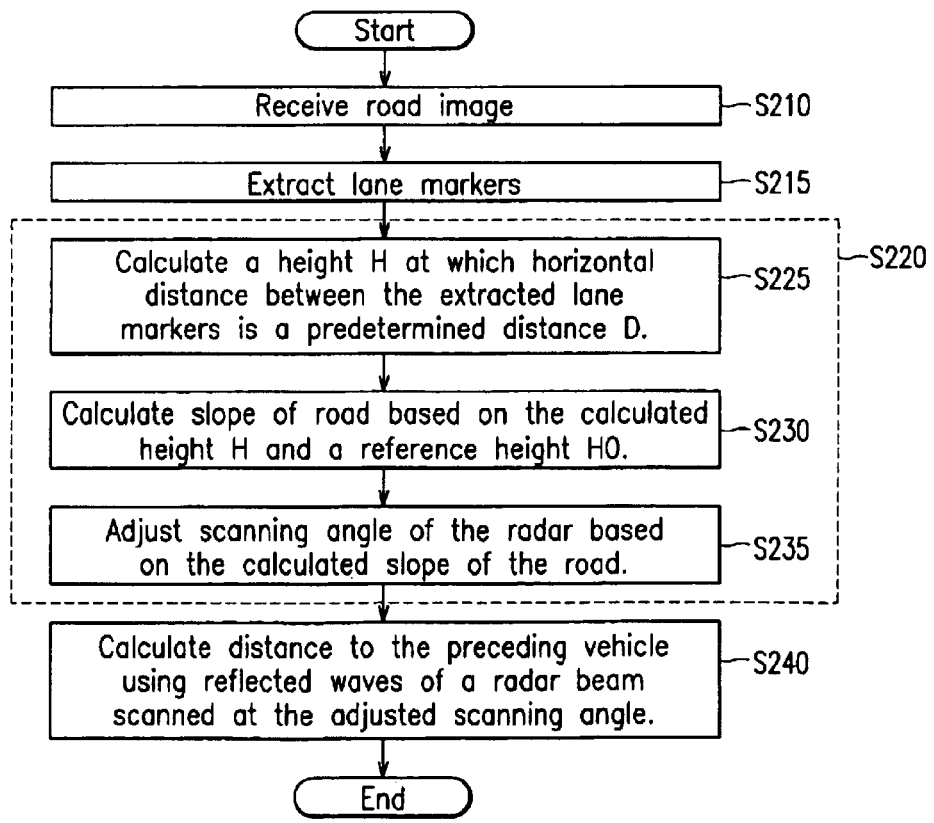
FIG. 2 is a flowchart showing a method for detecting distance to a preceding vehicle according to an embodiment of the present invention.

A method for detecting distance to a preceding vehicle is hereinafter described with reference to FIG. 2. The method is explained with reference to the case that the vehicle 100, equipped with the radar 120, detects the distance to a preceding vehicle 190 using the radar 120. Initially, at step S210, the ECU 150 receives a signal of a road image from the camera 110. Subsequently, at step S215, the ECU 150 extracts lane markers from the image of the road. Preferably at least two adjacent lane markers are extracted, at step S215. Step S215, the extraction of lane markers from the road image, can be realized by a person of ordinary skill in the art in a variety of fashions. For example, the lane markers can be extracted based on brightness of pixels on the image.

Following extraction of the lane markers, the ECU 150 adjusts the scanning angle of the radar 120 based on the extracted lane markers, at step S220. Subsequently, at step S240, the ECU 150 calculates a distance to the preceding vehicle 190 using reflected waves of the radar beam 125 scanned at the adjusted scanning angle. The step S240 of calculating a distance to the preceding vehicle 190 using reflected waves of a radar beam 125 is obvious to a person of ordinary skill in the art. 19) Step S220, the adjusting of the scanning angle of the radar 120 is hereinafter described in more detail. Initially, at step S225, the ECU 150 calculates a height H within the image in which a horizontal distance between the extracted lane markers is a predetermined distance D. The predetermined distance D may be set by a person of ordinary skill in the art with reference to factors related to the camera 110, such as an exposing direction of the camera 110 and size of the road image.

Figure 3A:
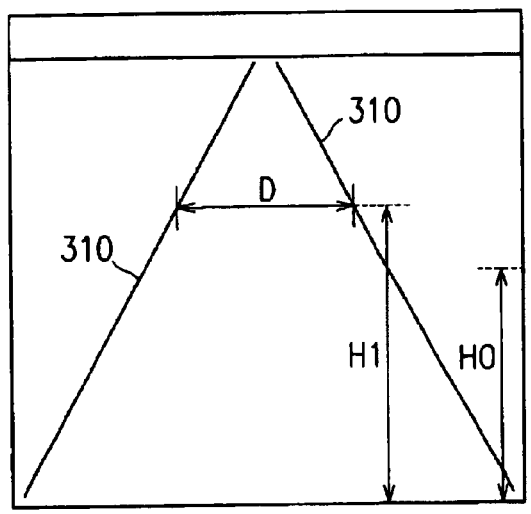
FIGS. 3A, 3B, and 3C respectively show road images and extracted lane markers when the forthcoming road is curved upward, flat, and curved downward.
Figure 3B:
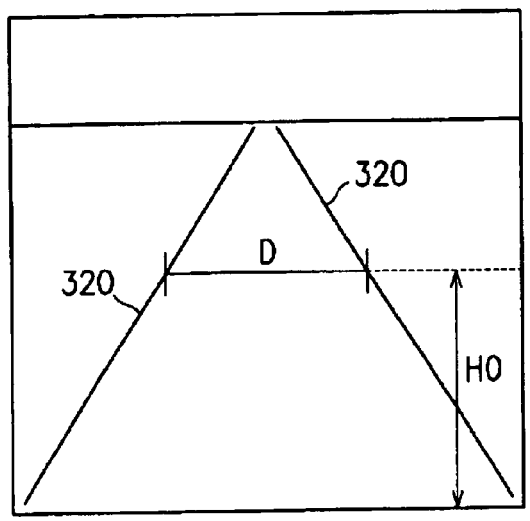
Figure 3C:
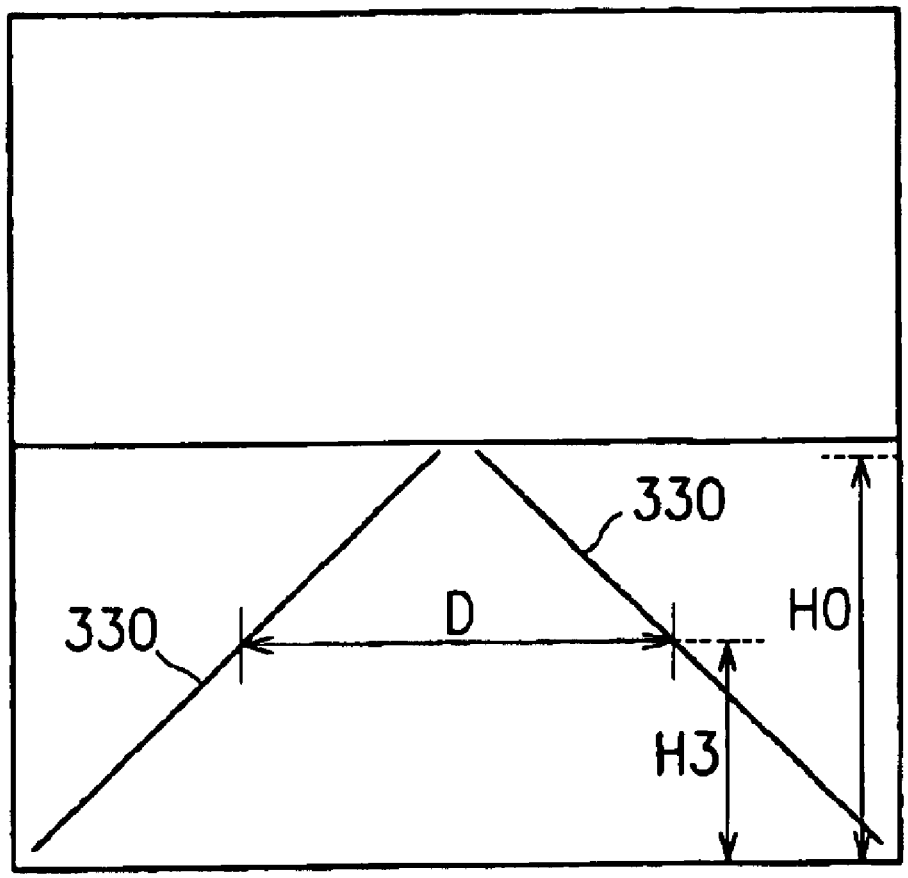

FIGS. 3A, 3B, and 3C show road images and extracted lane markers when the forthcoming road is curved upward, flat, and curved downward, respectively.

FIG. 3B represents the case where the forthcoming road is flat. H0 is set as a reference height within the image corresponding to lane markers separated by a predetermined distance D. When the forthcoming road is curved upward (refer to FIG. 1 and FIG. 3A), the position of lane markers 310 in the road image, separated by the predetermined distance D, is moved upward. The position within the image of the lane markers, where the distance between the lane markers is the predetermined distance D, is H1. When the road curves upward, H1 is higher than H0 within the image. To the contrary, when the forthcoming road is curved downward (refer to FIG. 3C), the position of the lane markers 330 separated by the predetermined distance D in the road image is moved downward. In this case, a height H3 at the predetermined horizontal distance D between extracted lane markers 330 becomes lower than the reference height H0.

After the height H is calculated at step S225 (FIG. 2), the ECU 150 calculates, at step S230, the slope of the forthcoming road based on the calculated height H. Therefore, the slope of the forthcoming road is calculated based on a difference between the calculated height H and a reference height H0.

The step S230 of calculating the slope of the road, based on the difference between the calculated height H and a reference height H0, can be realized by a person of ordinary skill in the art. For example, the relation between the slope of the road and the difference of the two heights, which can be obtained by simple experiments, can be formalized as a lookup table.

In the above, the reference height H0 is explained as a height at which the horizontal distance between the extracted lane markers is the predetermined distance D when the forthcoming road is flat. The value of such reference height H0 may be varied according to a variety of factors, such as camera angle and the like. Thus the value of the reference height H0 for a specific vehicle may be set as a constant by a person of ordinary skill in the art, considering factors related to the specific vehicle's specification. However, it is more preferable that the reference height H0 is an average value of the calculated height H of extracted lane markers over a predetermined period. This feature can reduce error in calculation of the slope of the road in the case that the exposed direction of the camera 110 is changed by arbitrary reasons or factors. Furthermore, when the actual distance between lane markers on the road is varied, this feature can reset the value of the reference height H0 as an appropriate value to the varied distance of actual lane markers after a period of time. The predetermined period may be set by a person of ordinary skill in the art with reference to average undulation of the road on which the vehicle 100 runs.

Referring back to FIG. 2, when the slope of the forthcoming road is calculated, at step S230, the ECU 150 adjusts the scanning angle of the radar 120, at step S235, based on the calculated slope of the forthcoming road. The amount of adjustment of the scanning angle may be calculated by a person of ordinary skill in the art. For example, the amount of adjustment may be calculated proportionally to the slope of the forthcoming road.

While this invention has been described in connection with what is presently considered the most practical and preferred embodiment, it is to be understood that the invention is not limited to the disclosed embodiments, but, on the contrary, is intended various modifications and equivalent arrangements include within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for a vehicle equipped with a radar for detecting distance to a preceding vehicle, comprising:
   receiving a signal of a road image from a camera;
   extracting lane markers from the road image;
   adjusting a scanning angle of a radar based on the extracted lane markers, wherein said adjusting a scanning angle comprises:
      calculating a height within said image at which a horizontal distance between the extracted lane markers is a predetermined distance;
      calculating a slope of the road based on the calculated height;
      adjusting a scanning angle of the radar based on the calculated slope of the road; and
   calculating a distance to a preceding vehicle using reflected waves of a radar beam scanned at the adjusted scanning angle.

2. The method of claim 1, wherein said calculating a slope of a road calculates the slope of the road based on a difference between the calculated height and a reference height.

3. The method of claim 2, wherein the reference height is an average value of the calculated height over a predetermined period.

4. An apparatus for a vehicle for detecting distance to a preceding vehicle, the apparatus comprising:
   a radar for scanning a radar beam from the vehicle;
   a scanning angle adjustor for adjusting a scanning angle of the radar;
   a camera for acquiring a road image; and
   an electronic control unit activated by predetermined software wherein said predetermined software comprises instructions for:
      receiving a signal of a road image from the camera;
      extracting lane markers from the road image;

adjusting the scanning angle of the radar based on the extracted lane markers, wherein said adjusting scanning angle comprises:

calculating a height at which a horizontal distance between the extracted lane markers is a predetermined distance;

calculating slope of a road based on the calculated height;

adjusting a scanning angle of the radar based on the calculated slope of the road;

calculating a distance to the preceding vehicle using reflected waves of the radar beam scanned at the adjusted scanning angle.

5. The apparatus of claim 4, wherein said calculating slope of a road calculates the slope of the road based on a difference between the calculated height and a reference height.

6. The apparatus of claim 5, wherein the reference height is an average value of the calculated height over a predetermined period.

7. A method for calculating distance to a preceding vehicle, comprising:

acquiring an image of a forthcoming road, wherein said image includes lane markers;

extracting lane markers from said image;

adjusting a scanning angle of a radar in accordance with said image of a forthcoming road;

calculating a height within said image corresponding to lane markers separated by a horizontal distance substantially equal to a predetermined distance; and calculating a distance to a preceding vehicle based on reflected radar waves from said radar projected at said adjusted scanning angle.

8. The method of claim 7, further comprising, before said calculating a distance, calculating a slope of the road based on said calculated height within said image.

9. The method of claim 8, wherein said calculating of a slope of the road is based on the difference between the calculated height within said image and a reference height corresponding to lane markers separated by a predetermined distance.

10. The method of claim 8, wherein said calculating of a slope of the road is based on an average value of the calculated height within said image corresponding to lane markers separated by a predetermined distance of at least two sets of lane markers.

* * * * *